US009126585B2

(12) United States Patent
Takizawa et al.

(10) Patent No.: US 9,126,585 B2
(45) Date of Patent: Sep. 8, 2015

(54) CONTROL DEVICE FOR HYBRID VEHICLE

(75) Inventors: Keiji Takizawa, Toyota (JP); Tomohiko Miyamoto, Toyota (JP); Shuhei Matsusaka, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/347,760

(22) PCT Filed: Oct. 6, 2011

(86) PCT No.: PCT/JP2011/073137
§ 371 (c)(1),
(2), (4) Date: Mar. 27, 2014

(87) PCT Pub. No.: WO2013/051140
PCT Pub. Date: Apr. 11, 2013

(65) Prior Publication Data
US 2014/0236410 A1 Aug. 21, 2014

(51) Int. Cl.
*B60L 9/00* (2006.01)
*B60W 20/00* (2006.01)
(Continued)

(52) U.S. Cl.
CPC .............. *B60W 20/106* (2013.01); *B60K 6/445* (2013.01); *B60L 3/0046* (2013.01); *B60L 3/0061* (2013.01); *B60L 3/04* (2013.01); *B60L 11/123* (2013.01); *B60L 11/14* (2013.01); *B60L 11/1816* (2013.01); *B60L 11/1861* (2013.01); *B60L 11/1862* (2013.01); *B60L 15/20* (2013.01); *B60W 10/08* (2013.01); *B60W 10/26* (2013.01); *B60W 20/50* (2013.01); *H02P 29/0055* (2013.01); *B60L 2210/14* (2013.01); *B60L 2210/40* (2013.01); *B60L 2240/12* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60W 2510/087* (2013.01);
(Continued)

(58) Field of Classification Search
CPC ...... B60K 23/08; B60K 6/445; B60L 11/123; B60L 11/14; B60L 11/1816; B60L 11/1861; B60L 11/1862; B60L 15/20; B60L 2210/10; B60L 2210/40; B60L 2240/421; B60L 2240/423; B60L 2240/425; B60L 2240/44
See application file for complete search history.

(56) References Cited

U.S. PATENT DOCUMENTS

2003/0155891 A1* 8/2003 Ishishita .................. 320/134
2006/0152195 A1* 7/2006 Ishishita .................. 320/132
(Continued)

FOREIGN PATENT DOCUMENTS

JP    A-2009-255916    11/2009
JP    A-2011-51395     3/2011
(Continued)

*Primary Examiner* — Redhwan k Mawari
(74) *Attorney, Agent, or Firm* — Oliff PLC

(57) ABSTRACT

A control device for a hybrid vehicle, including a mode whereby the vehicle runs using a motor only, and a mode whereby the vehicle uses both the motor and an engine. When the motor temperature of an MG(2) exceeds a threshold temperature, an ECU moves from a running mode that uses the MG(2) only, to a running mode that limits the load on the MG(2). When the charging state of a battery for running exceeds a threshold value, the ECU performs control such that in addition to the system voltage for driving the MG(2) being reduced, the threshold temperature is increased, and the running mode whereby only the MG(2) is used is maintained.

1 Claim, 5 Drawing Sheets

(51) Int. Cl.

| | | |
|---|---|---|
| *B60K 6/445* | (2007.10) | |
| *B60W 10/08* | (2006.01) | |
| *B60L 3/00* | (2006.01) | |
| *B60L 3/04* | (2006.01) | |
| *B60L 11/12* | (2006.01) | |
| *B60L 11/14* | (2006.01) | |
| *B60L 11/18* | (2006.01) | |
| *B60L 15/20* | (2006.01) | |
| *H02P 29/00* | (2006.01) | |
| *B60W 10/26* | (2006.01) | |

(52) U.S. Cl.
CPC .......... *Y02T 10/6217* (2013.01); *Y02T 10/6239* (2013.01); *Y02T 10/642* (2013.01); *Y02T 10/705* (2013.01); *Y02T 10/7005* (2013.01); *Y02T 10/7044* (2013.01); *Y02T 10/7077* (2013.01); *Y02T 10/7225* (2013.01); *Y02T 10/7241* (2013.01); *Y02T 10/7275* (2013.01); *Y02T 90/127* (2013.01); *Y02T 90/14* (2013.01); *Y10S 903/93* (2013.01)

(56) References Cited

U.S. PATENT DOCUMENTS

| | | | |
|---|---|---|---|
| 2008/0115997 A1* | 5/2008 | Banno et al. | 180/242 |
| 2012/0150374 A1 | 6/2012 | Yamazaki et al. | |
| 2014/0236410 A1* | 8/2014 | Takizawa et al. | 701/22 |

FOREIGN PATENT DOCUMENTS

| | | | | |
|---|---|---|---|---|
| JP | A-2011-168226 | | 9/2011 | |
| WO | WO/2009/084381 | * | 7/2009 | H02P 9/04 |

* cited by examiner

| SOC(%) | SYSTEM VOLTAGE (V) | THRESHOLD TEMPERATURE (°C) |
|---|---|---|
| x | Vx | Tx |
| y | Vy | Ty |
| ... | ... | ... |

CONTROL DEVICE FOR HYBRID VEHICLE

TECHNICAL FIELD

The present invention relates to a control device for a hybrid vehicle.

BACKGROUND ART

Hybrid vehicles that run with power of at least one of an engine and a motor have been known. In a hybrid vehicle, the storage quantity or the state of charge (SC) of a battery provided for supplying power to the motor is controlled to be within a predetermined range. When the SOC of the battery is equal to a lower limit value of the predetermined range or is lower, the engine is forcedly driven to charge the battery with power which is generated by using a driving force of the engine, to thereby restore the SOC of the battery.

On the other hand, while the distance a hybrid vehicle can travel using a motor only must be maximized in order to enhance fuel efficiency, there has simultaneously been known technology for controlling to limit the load on the motor when the temperature of the motor exceeds a predetermined allowable temperature, in order to prevent performance deterioration of the motor.

Patent Document 1 indicated below discloses a hybrid driving apparatus which performs load limitation control for limiting a load applied to a motor when the temperature of the motor exceeds a predetermined temperature. Patent Document 1 discloses that a unit which detects a load mounted state or a traction state of a vehicle is provided and a load limitation start temperature is determined based on the load mounted state or the traction state which is detected. More specifically, when the vehicle is in a traction state and the travel resistance is greater than that in a non-traction state, the load limitation start temperature is set to be lower than the temperature in the non-traction state. Further, when the quantity of traction is great, the load limitation start temperature is set to be further lower than the temperature when the quantity of traction is small. With the above setting, in a state in which a heating limit temperature which is a limit temperature that the motor can resist is determined, the temperature of the motor can be maintained within the range of the heating limit temperature even when the travel resistance is increased due to the large quantity of mounted load or the traction state to thereby increase the rate of temperature rise.

Further, Patent Document 2 indicated below discloses a control device for a vehicle, which secures the emission clarification performance, without making a user feel uncomfortable, when CD (Charge Depleting mode) in which running with power of a motor only is preferentially performed is shifted to CS (Charge Sustain mode) in which running is performed with power of the engine and the motor, in a plug-in hybrid vehicle.

PRIOR ART DOCUMENTS

Patent Documents

Patent Document 1: JP 2009-255916 A
Patent Document 2: JP 2011-51395 A

DISCLOSURE OF THE INVENTION

Technical Problems

Here, while performing the load limitation control for limiting the load applied to the motor when the temperature of the motor exceeds the predetermined temperature is an effective technique for protection of the motor, uniform limitation of the load on the motor would result in a reduction in the distance which the vehicle runs using the motor only. For example, when the SOC of the battery which supplies power to the motor is sufficiently high, despite the sufficient power to be supplied to the motor from the battery, control is shifted to the load limitation control if the temperature of the motor reaches the predetermined temperature. Thus, there is a problem that, despite the situation that power of the battery can be actually utilized sufficiently, running using only the power of the motor cannot be maintained due to circumstances of the motor, which prevents effective use of the power of the battery.

In particular, concerning plug-in hybrid vehicles in which the battery can be charged with electric power from a power source external to the vehicle, such as a household power source, as the electric power from the household power source is generated efficiently by an electric power company, it is desired to preferentially utilize and make full use of the power of the battery.

An advantage of the present invention is therefore to provide a control device for a hybrid vehicle which runs with power from at least one of an engine and a motor, which is capable of further increasing a distance the vehicle can run with power of the motor only.

Solution to Problems

The present invention provides a control device for a hybrid vehicle comprising an engine and a motor, the vehicle having a running mode in which the vehicle runs with a motor load being limited when a temperature of the motor exceeds a threshold, wherein the vehicle comprises a battery for supplying power to the motor via an inverter, and changes voltage to be supplied to the motor by the battery in accordance with a state of charge of the battery.

According to one embodiment of the present invention, when a quantity of charge of the battery for supplying the power to the motor is large, the vehicle changes the voltage to be supplied to the motor to a relatively lower voltage as compared to a case. where the quantity of charge of the battery is small.

According to another embodiment of the present invention, the vehicle changes the voltage and also changes a threshold temperature for running with the motor load being limited.

According to a further embodiment of the present invention, the vehicle changes the voltage to a lower voltage and also changes the threshold temperature to a higher temperature.

Advantageous Effects of Invention

According to the present invention, in a hybrid vehicle which runs with power of at least one of an engine and a motor, the distance the vehicle can run with power of the motor only can be further increased than in the past, so that fuel efficiency can be enhanced.

BEST MODE FOR CARRYING OUT THE INVENTION

Preferred embodiments of the present invention will be described with reference to the drawings.

Figure 1:
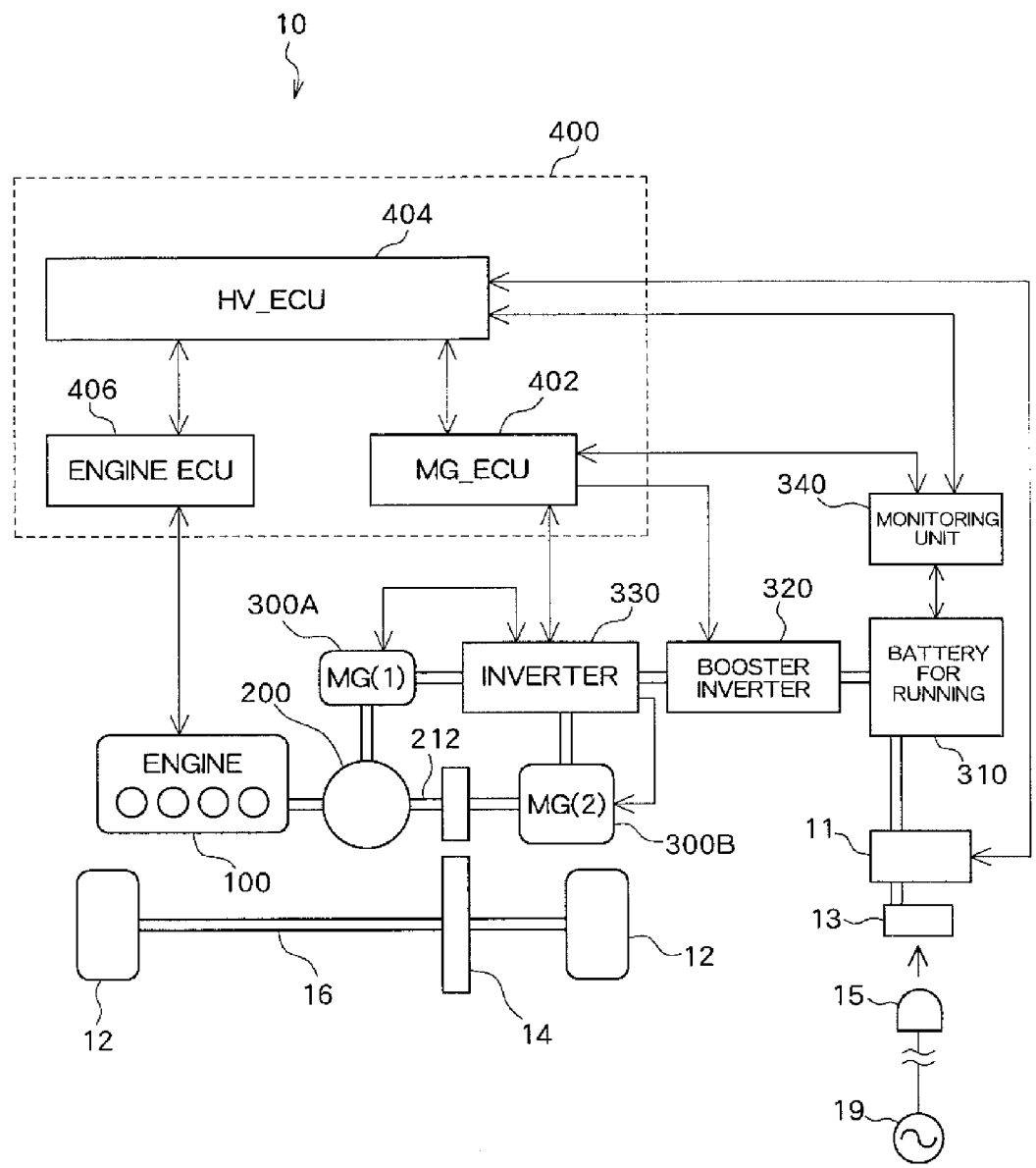
[FIG. 1] View illustrating a system configuration according to an embodiment.

FIG. 1 illustrates a system configuration of a hybrid vehicle 10 according to the present embodiment. The hybrid vehicle 10 is a plug-in hybrid vehicle, for example. The vehicle 10 runs using power of at least one of an engine 100 and a second motor generator MG(2) 300B. A battery for running 310 which supplies electric power to the MG(2) 300B and other components can be charged with electric power from an alternating current power source 19 external to the vehicle, such as a household power source.

The vehicle 10 includes, in addition to the engine 100, the MG(2) 300B, and the battery for running 310, a power distributing mechanism 200, a decelerator 14, an inverter 330, a booster converter 320, an engine ECU 406, an MGECU 402, an HVECU 404, and other elements.

The power distributing mechanism 200 distributes the power generated by the engine 100 to an output shaft 212 and a first motor generator MG(1) 300A. With the engine 100, the MG(1) 300A, and the MG(2) 300B being coupled via the power distributing mechanism 200, the revolution rate of each of the engine 100, the MG(1) 300A, and the MG(2) 300B is determined such that, upon determination of the revolution rates of any two, the revolution rate of the remaining one can be determined.

The decelerator 14 transmits the power generated by the engine 100, the MG(1) 300A, and the MG(2) 300B, to driving wheels 12, or transmits drive of the driving wheels 12 to the engine 100, the MG(1) 300A, and the MG(2) 300B.

The inverter 330 mutually converts direct current of the battery for running 310 and alternating current of the MG(1) 300A and the MG(2) 300B.

The booster converter 320 performs voltage conversion between the battery for running 310 and the inverter 330.

The engine ECU 406 controls an operation state of the engine 100. The MGECU 402 controls the charge/discharge state of the MG(1) 300A, the MG(2) 300B, the inverter 330, and the battery for running 310, in accordance with the state of the vehicle 10. The HVECU 404 mutually manages and controls the, engine ECU 406 and the MGECU 402 to thereby control the whole system such that the vehicle 10 can run in the most efficient manner. The engine ECU 406, the MGECU 402, and the HVECU 404 may be combined in a single ECU rather than forming separate components. FIG. 1 illustrates that these three ECUs are combined into a single ECU 400.

The ECU 400 receives signals from a vehicle speed sensor, an accelerator position sensor, a throttle opening sensor, an MG(1) rotation speed sensor, an MG(2) rotation speed sensor, an engine rotation speed sensor, an MG(1) temperature sensor, an MG(2) temperature sensor, and a monitoring unit 340 which monitors the state of the battery for running. The ECU 400, when the MG(1) 300A or the MG(2) 300B is caused to function as a motor, boosts the direct current power from the battery for running 310 with the booster converter 320 and thereafter converts the boosted direct current power to alternating current power with the inverter and supplies the power to the MG(1) 300A and the MG(2) 300B. Further, when charging the battery for running 310, the ECU 400 causes the MG(1) 300A to generate electricity by the power of the engine 100 transmitted via the power distributing mechanism 200 or causes the MG(2) 300B to generate electricity by running energy of the vehicle transmitted via the decelerator 14. The ECU 400 converts the alternating current power generated by the MG(1) 300A or the MG(2) 300B to direct current power with the inverter 300, reduces the direct current power by the booster converter 320, and supplies the power to the battery for running 310. It is also possible that the ECU 400 converts the alternating current power from the alternating current source 19 to direct current power and supplies the direct current power to the battery for running 310, thereby charging the battery for running 310.

The vehicle has, as running modes, a mode in which running with the power of the MG(2) 300B without using the power of the engine 100 (EV running) is preferentially performed and a mode in which running with power of both the engine 100 and the MG(2) 300B (HV running) is performed. The mode in which the EV running is preferentially performed is a mode which gives preference to consumption of the power of the battery for running 310 over preservation of the power. As a basic control operation, the ECU 400 monitors the SOC of the battery for running 310, and maintains this EV running mode when the state of charge (SOC) of the battery for running 310 is a predetermined value or higher and also until the motor temperature detected by the MG(2) temperature sensor reaches a threshold temperature. When the motor temperature exceeds the threshold temperature, the ECU 400 releases the EV running mode and shifts to the control for limiting the load on the MG(2) 300B. If the state of charge (SOC) of the battery for running 310 is less than the predetermined value, the control mode is shifted to the HV running mode.

The vehicle 10 further includes a connector 13 for connecting a paddle 15 connected to the alternating current power source 19, and a charging device 11 which converts the power from the alternating current power source 19 supplied via the connector 13 to the direct current and supplies the current to the battery for running 310. The charging device 11 controls a quantity of power for charging the battery for running 310 in accordance with a control signal from the HVECU 404.

Figure 2:
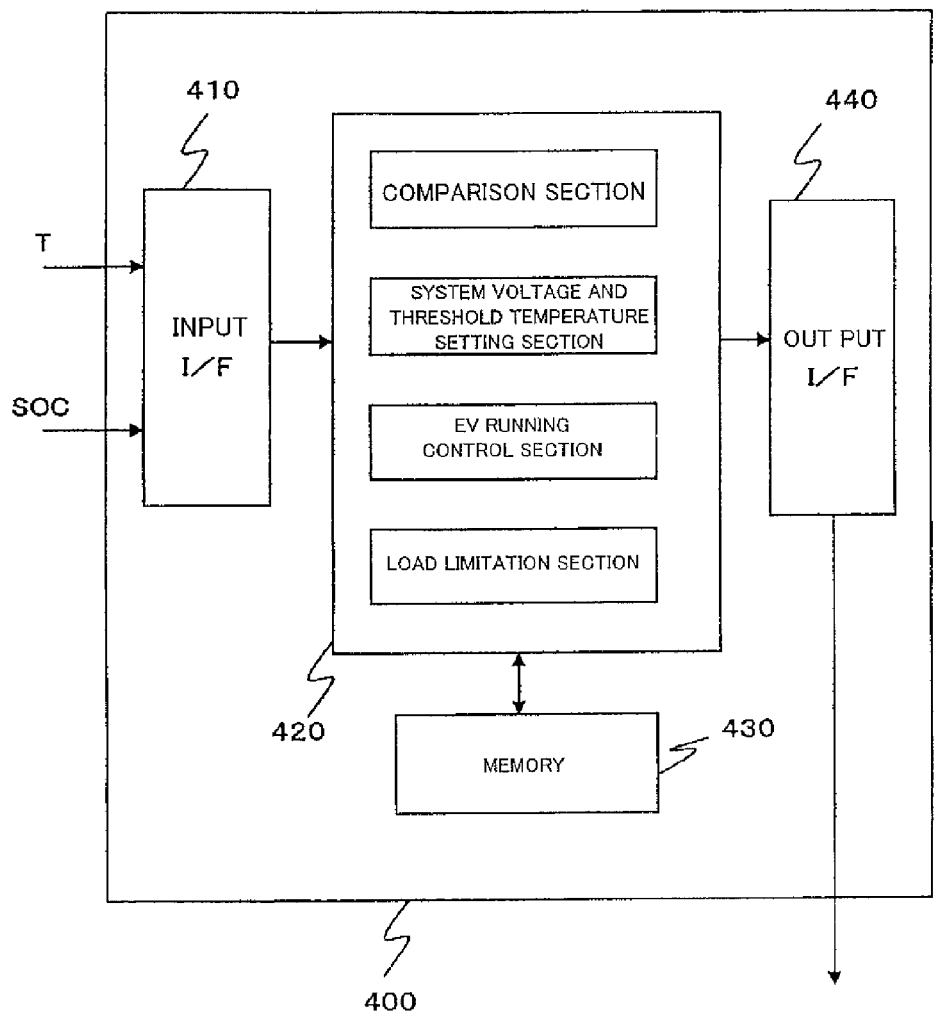
[FIG. 2] Block diagram illustrating the configuration of an ECU.

FIG. 2 is a block diagram illustrating the configuration of the ECU 400. The ECU 400 includes an input interface I/F 410, an operation section (processor) 420, a memory 430, and an output interface I/F 440.

As described above, the input interface I/F 410 receives signals from the vehicle speed sensor, the accelerator position sensor, the throttle opening sensor, the MG(1) rotation speed sensor, the MG(2) rotation speed sensor, the engine rotation speed sensor, the MG(1) temperature sensor, the MG(2) temperature sensor, and the monitoring unit 340 which monitors the state of the battery for running. The drawing only indicates a motor temperature T of the MG(2) detected by the MG(2) temperature sensor and the state of charge (SOC) of the battery for running 310.

The operation section 420 includes, as a function block, a comparison section, a system voltage and threshold temperature setting section, an EV running control section, and a load limitation section. The comparison section, as a first function, compares the motor temperature of the MG(2) 300B which is detected with the threshold temperature and determines whether or not the motor temperature T exceeds the threshold temperature Tth. Further, the comparison section, as a second function, compares the SOC of the battery for running 310 which is detected with a threshold SOC. The system voltage and threshold temperature setting section sets the system voltage V and the threshold temperature Tth in accordance with the SOC of the battery for running 301. More specifically, the system voltage and threshold temperature setting section accesses the memory 430 and sets the system voltage V and the threshold temperature Tth based on a predetermined relationship among the SOC, the system voltage, and the threshold temperature Tth stored in the memory 430. The EV running control section controls driving of the MG(2) 300B and the engine 100 so as to control running of the vehicle 10 in the EV running mode. The load limitation section performs various controls for limiting the load on the MG(2) 300B based on the comparison result of the comparison section. More specifically, the load limitation section limits the load on the MG(2) when the motor temperature T exceeds the threshold temperature Tth in the comparison section, and does not limit the load on the MG(2) and maintains the EV running mode when the motor temperature T does not exceed the threshold temperature Tth.

The output interface I/F 440 outputs the processing result in the operation section 420 as a control command.

The memory 430 previously stores the relationship among the SOC of the battery for running 310, the system voltage, and the threshold temperature Tth, as described above.

Figure 3:
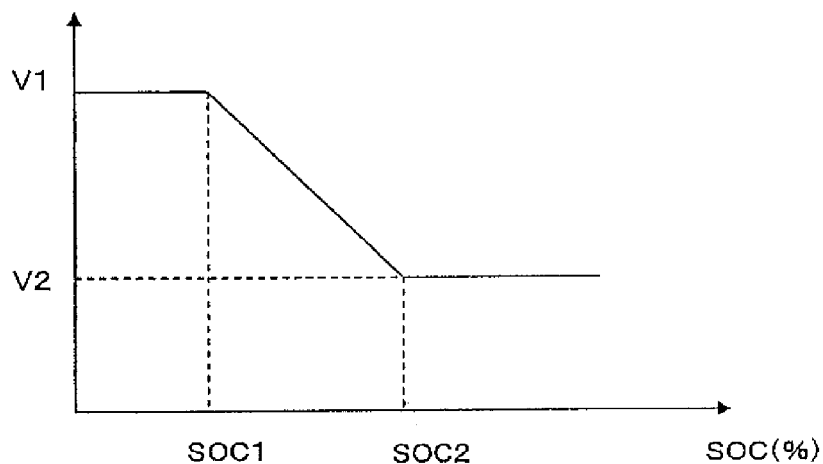
[FIG. 3] Graph indicating a relationship between SOC and system voltage.

FIG. 3 indicates a relationship between the SOC of the battery for running 310 and the system voltage. The SOC is expressed in percentage with the full charged state being expressed as 100. The system voltage is a direct current voltage serving as a source of the alternating current power to be supplied to the MG(2) 300B from the battery for running 310, and is a direct current voltage which has been boosted by the booster converter 320; i.e., the direct current voltage to be applied to the inverter 330. The system voltage value is determined by a boost ratio at the booster converter 320.

As illustrated in the figure, if the SOC is SOC1 or lower, the system voltage V is V1; if the SOC is between SOC1 and SOC2 (SOC1<SOC2), the system voltage V decreases in accordance with the SOC; and if the SOC is SOC2 or higher, the system voltage V is V2, in which V1>V2. As described above, the system voltage V is set to sequentially decrease as the SOC increases, when the SOC is greater than the certain value SOC1. While SOC1 and SOC2 are set as desired, SOC1 is set to 50% and SOC2 is set to 70%, for example. Further, while V1 and V2 are also set as desired, V1 is set to 650V and V2 is set to 500V, for example.

The system voltage V is reduced in accordance with the SOC for the following reasons. When the SOC of the battery for running 310 is the certain value SOC1 or greater, as there is a sufficient storage quantity of the battery for running 310, the storage quantity of the battery for running 310 should be consumed as much as possible to drive the MG(2) 300B as a motor and to maintain the EV running mode in which the vehicle runs only with the power of the MG(2) 300B, thereby increasing the running distance based on the EV running mode. On the other hand, even if there is a sufficient storage quantity of the battery for running 310, when the motor temperature of the MG(2) 300B increases to exceed the threshold temperature, it is necessary to shift to the load limitation control for limiting the load on the MG(2) 300B in order to prevent malfunction of and damages to the MG(2) 300B. Here, high motor temperatures of the MG(2) 300B would cause damages, because discharge occurs between coils of the motor by the surge voltage, which results in loss of insulation properties and in short-circuit. As this phenomenon has temperature dependency, higher temperature would cause the discharge at a lower surge voltage. Accordingly, even if the motor temperature is high, when the surge voltage is sufficiently low, no discharge occurs between the coils. The surge voltage can be reduced by changing the boost ratio of the booster converter 320 to reduce the system voltage V after boosting. In the present embodiment, based on such a principle, when the SOC is the certain value SOC1 or greater and there is a sufficient storage quantity, the system voltage V is reduced from V1 to thereby lower the surge voltage, so as to prevent occurrence of discharge between coils of the MG(2) 300B.

As described above, as, with a reduction of the system voltage V in accordance with the SOC, the surge voltage is reduced to thereby prevent occurrence of discharge between the coils, the allowable range of the motor temperature can be increased accordingly. Even when the motor temperature is high, discharge does not occur if the surge voltage is sufficiently low. This means that the threshold temperature of the motor temperature; i.e., the threshold temperature for shifting from the EV running mode to the load limitation control for limiting the load, can be shifted toward the higher temperature side.

Figures 4, 5:
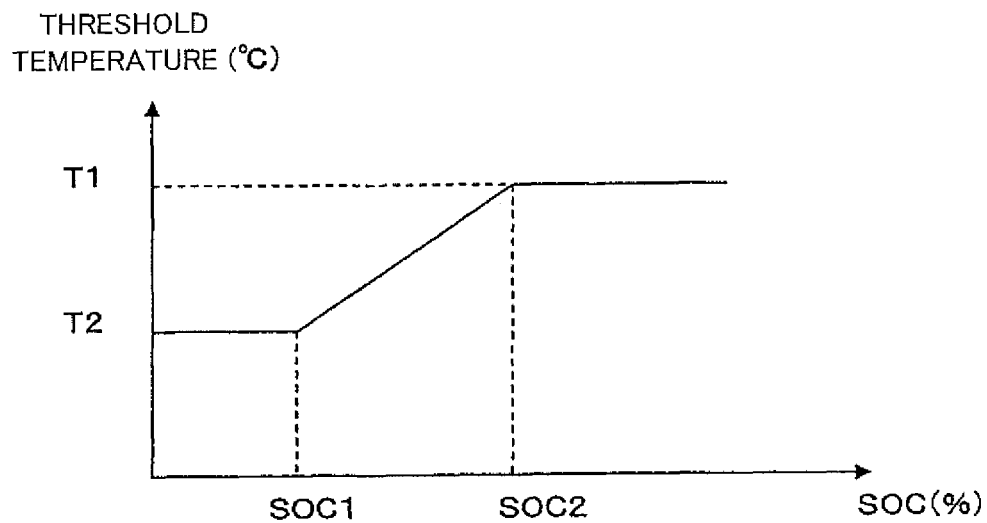
[FIG. 4] Graph indicating a relationship between SOC and a threshold temperature.
[FIG. 5] Table explanatory view indicating a relationship among the SOC, system voltage, and threshold temperature.

FIG. 4 illustrates a relationship between the SOC of the battery 310 for running and the threshold temperature Tth. When the SOC is SOC1 or less, the threshold temperature Tth is T2. When the SOC exceeds SOC1, the threshold temperature Tth is sequentially increased, and when the SOC is SO2 or greater, the threshold temperature Tth is set to T1. Here, T2>T2. By setting the threshold temperature Tth to high temperatures, the threshold temperature Tth is not exceeded even when the motor temperature of the MG(2) 300B is high, so that the EV running mode can be maintained without shifting to the load limitation control.

While FIGS. 3 and 4 specify the relationship between the SOC and the system voltage and the relationship between the SOC and the threshold temperature as functions, respectively, the relationships may be specified as a table.

FIG. 5 illustrates an example table specifying the relationship among the SOC, the system voltage, and the threshold temperature. For each SOC, the corresponding system voltage and the threshold temperature are specified. For example, when the SOC is x (%), the system voltage is Vx (V) and the threshold temperature is Tx (° C.), and when the SOC is y(%), the system voltage is Vy(V) and the threshold temperature is Ty (° C.). More specifically, when the SOC is 50%, the system voltage is 650V and the threshold temperature is 180 degrees. When the SOC is 70%, the system voltage is 500V and the threshold temperature is 220 degrees. The memory 430 stores the relationships among the SOC, the system voltage, and the threshold temperature, as the functions indicated in FIGS. 3 and 4 or as the table indicated in FIG. 5. The operation section within the ECU 400 uses such a relationship stored in the memory 430 to output a control command for switching between the EV running mode and the load limitation.

Figure 6:
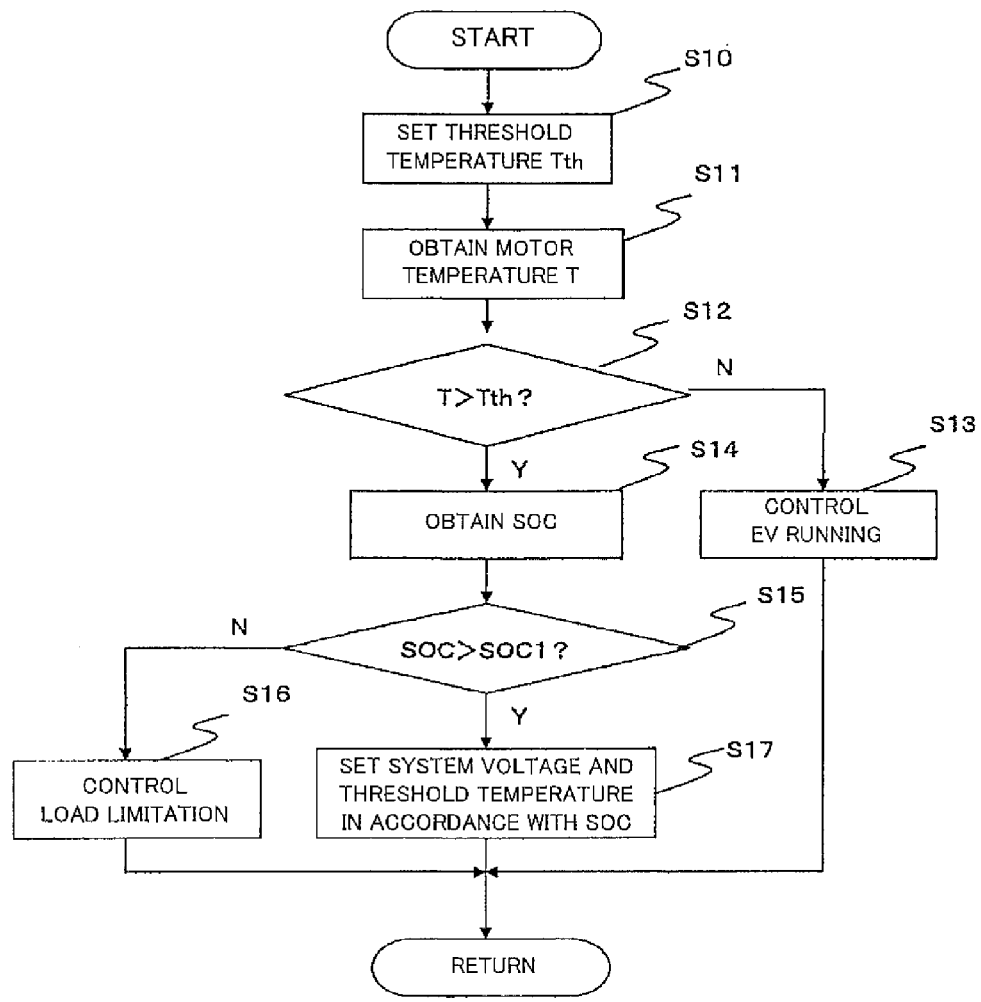
[FIG. 6] Flow chart illustrating processing according to the embodiment.

FIG. 6 illustrates a processing flowchart of the ECU 400 according to the present embodiment. First, the ECU 400 sets a default threshold temperature Tth (S10). The default threshold temperature Tth is preferably set in accordance with a default system voltage, and is set to 180° C. when the default system voltage is 650V, for example.

The ECU 400 then obtains the motor temperature T of the MG(2) 300B (S11).

After obtaining the motor temperature T, the EUC 400 compares the obtained motor temperature with the threshold temperature Tth (S12).

When the comparison result does not indicate T>Tth; i.e., when the motor temperature of the MG(2) 300B does not exceed the threshold temperature Tth, the ECU 400 performs control to maintain the EV running mode in which the vehicle runs only with the power of the MG(2) 300B (S13). When the comparison result indicates T>Tth; i.e., when the motor temperature of the MG(2) 300B exceeds the threshold temperature Tth, the ECU 400 obtains the SOC of the battery for running 310 (S14), and compares the obtained SOC with the threshold SOC; i.e., SOC1 (S15). The threshold SOC can be set simultaneously with the setting of the threshold temperature at S10, for example. The SOC1 serving as the threshold SOC is 50%, for example.

When the comparison result does not indicate SOC>SOC1; i.e., when the SOC of the battery 310 for running is SOC1 or less, determining that the storage quantity of the battery for running 310 is not sufficient, the control is shifted from the EV running control to the load limitation control based on the fact that the motor temperature T of the MG(2) 300B exceeds the threshold temperature Tth, according to the original rule (S16). In the load limitation control, the load to the MG(2) 300B is limited and the power of the engine 100 is used in addition to the power of the MG(2) 300B. However, the load limitation control is not limited to this example, and may be performed with a change in the deceleration ratio in the decelerator 14 or a change in the engine torque. On the other hand, when the comparison result indicates SOC>SOC1; i.e., when the SOC of the battery 310 for running exceeds SOC1, determining that the storage quantity of the battery for running 310 is sufficient, the ECU 400 resets the system voltage and the threshold temperature from the default values in accordance with the SOC (S17). More specifically, the ECU 400, with the use of the relationship among the SOC, the system voltage, and the threshold temperature prestored in the memory 430, resets the system voltage and the threshold temperature corresponding to the SOC obtained in step S14. The system voltage which is reset is lower than the default system voltage, and the threshold temperature which is reset is higher than the default threshold temperature. Assuming that the default system voltage and the default threshold temperature are V0 and Tth0, respectively, and the reset system voltage and the reset threshold temperature are Vr and Tthr, respectively, the relationships of V0>Vr and Tth0<Tthr are satisfied.

After resetting the system voltage and the threshold temperature, the ECU 400 repeats the processing in step S10 and the following steps once again. However, as the threshold temperature Tth has been reset in step S17, the threshold temperature Tthr which has been set in S17 is used as the threshold temperature in S10. Because, when the threshold temperature has been reset in S17, whether the relationship of T>Tthr is satisfied or not is determined in S12, the possibility of maintaining the EV running control increases even when the motor temperature of the MG(2) 300B is high. More specifically, even when the motor temperature T of the MG(2) 300B exceeds Tth0, the EV running control would be maintained unless the motor temperature T exceeds Tthr.

As described above, according to the present embodiment, in a case in which the SOC of the battery for running 310 is a certain value or greater, the EV running mode is maintained by lowering the system voltage, even when the temperature of the motor for running exceeds the default threshold temperature. It is therefore possible to increase the running distance in the EV running mode, thereby increasing fuel efficiency. In particular, in a plug-in hybrid vehicle, the electric power which is effectively generated can be stored in the battery for running 310 to maintain the EV running in which the electric power which is effectively generated is maximally used, so that the energy efficiency can be enhanced.

While in the present embodiment, the relationship between the SOC and the system voltage and the relationship between the SOC and the threshold temperature illustrated in FIGS. 3 and 4, respectively, are used, other relationships may also be adopted.

Figure 7:
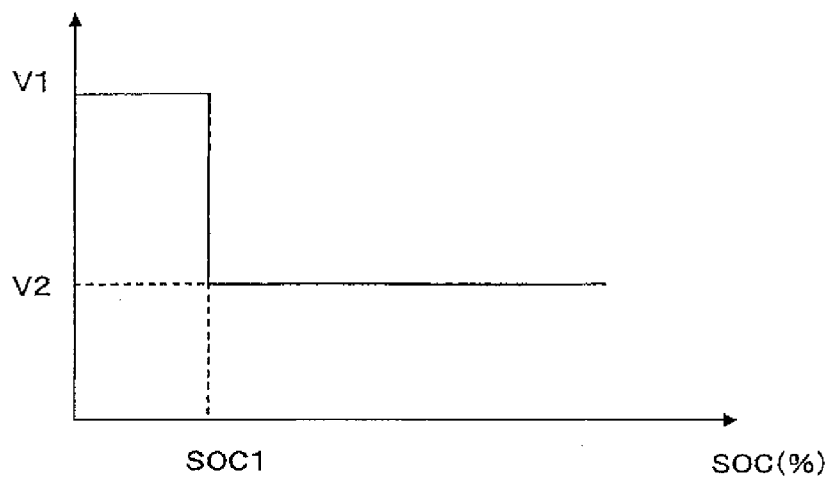
[FIG. 7] Graph indicating another relationship between SOC and system voltage.
Figure 8:
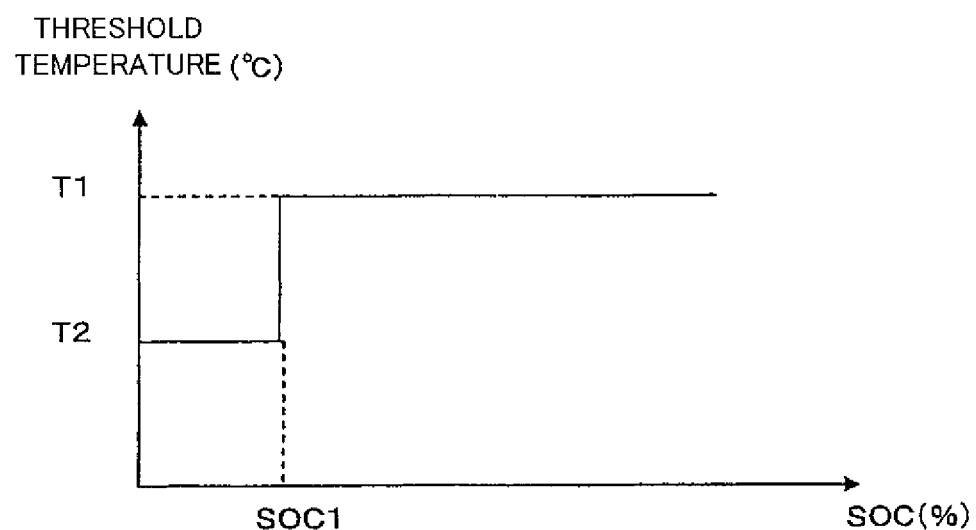
[FIG. 8] Graph indicating another relationship between SOC and a threshold temperature.

FIG. 7 indicates another relationship between the SOC and the system voltage and FIG. 8 indicates another relationship between the SOC and the threshold temperature.

Referring to FIG. 7, while the system voltage V is V1 when the SOC is a certain value SOC1 or less, the system voltage V is set to V2 which is lower than V1 when the SOC exceeds SOC1. Further, referring to FIG. 8, while threshold temperature Tth is T2 when the SOC is a certain value SOC1 or less, the threshold temperature Tth is set to T1 which is higher than T2 when the SOC exceeds SOC1. As such, each of the system voltage and the threshold temperature may be changed discontinuously or stepwise in accordance with the SOC.

Further, while in the present embodiment, the SOC of the battery for running 310 is obtained when the motor temperature exceeds the threshold temperature Tth (S14) as illustrated in FIG. 6, as the SOC of the battery for running 310 is continuously monitored at fixed control intervals, it is possible to use the SOC which is monitored at fixed control intervals in step S14. As such, the case in which the SOC is obtained in step S14 is not limited to the case where Yes is determined in step S12. This can be similarly applied to step S15.

Also, while in the present embodiment, the system voltage and the threshold temperature are set in accordance with the SOC of the battery for running 310 when the motor temperature T exceeds the threshold temperature Tth (S17) as illustrated in FIG. 6, this processing can be performed not only when the motor temperature T exceeds the threshold temperature Tth but also when the motor temperature T reaches the vicinity of the threshold temperature Tth. In this case, at a time point when, before the motor temperature T reaches the threshold temperature Tth, the motor temperature T is expected to exceed the threshold temperature Tth, the system voltage is changed to a lower voltage and the threshold temperature Tth is changed to a higher temperature in advance. More specifically, while in the present embodiment, the system voltage and the threshold temperature are changed when the motor temperature T exceeds the threshold temperature Tth and also the SOC of the battery for running 310 exceeds SOC1 as illustrated in FIG. 6, as another embodiment, the system voltage and the threshold temperature can be changed when the motor temperature T reaches the vicinity of the threshold temperature Tth and also the SOC of the battery for running 310 exceeds SOC1.

Further, while in the present embodiment, the system voltage and the threshold temperature are set in accordance with the SOC of the battery for running 310, when the motor temperature T exceeds the threshold temperature Tth (S17) as illustrated in FIG. 6, the system voltage may be set in accordance with the atmospheric pressure or altitude around the MG(2) 300B, in addition to the motor temperature T. More specifically, it is possible to set the system voltage to a relatively lower voltage as the altitude increases or the atmospheric pressure decreases and further change the system voltage, which has been thus set in accordance with the altitude or atmospheric pressure, in accordance with the SOC. Although the technology of changing the system voltage in accordance with the altitude or atmospheric pressure is known, with the technology of further changing the system voltage, which has been thus set in accordance with the altitude or atmospheric pressure, in accordance with the SOC, it is possible to further increase the EV running distance while preventing malfunction or damages of the MG(2) 300B, which would be particularly effective when running on mountain roads.

In addition, in the present embodiment, it is also possible to lower the system voltage and increase the power of an electrically-driven pump for supplying cooling oil to the MG(2) 300B to thereby cool the MG(2) 300B more intensively, when the SOC of the battery for running 301 exceeds the certain value SOC1 and also the storage quantity of the battery for running 310 is sufficient.

REFERENCE SYMBOLS

10 vehicle, 100 engine, 300A MG(1), 300B MG(2), 310 battery for running, 400 ECU.

The invention claimed is:

1. A control device for a hybrid vehicle having an engine and a motor, the vehicle having a running mode in which the vehicle runs with a motor load being limited when a temperature of the motor exceeds a threshold temperature, the control device comprising:

a detector configured to detect a state of charge of a battery arranged to supply power to the motor via an inverter; and a processor configured to set a direct current voltage supplied from the battery to the motor, the processor setting the direct current voltage to a first voltage value in response to the detector detecting the state of charge as a first state of charge value while the vehicle is running in the running mode, and the processor setting the direct current voltage to a second voltage value higher than the first voltage value in response to the detector detecting the state of charge as a second state of charge value lower than the first state of charge value while the vehicle is running in the running mode, wherein the processor sets the direct current voltage to the first voltage value, which is lower than the second voltage value, and also increases the threshold temperature in response to the detector detecting the state of charge as the first state of charge value, which is higher than the second state of charge value.

* * * * *